US006658205B1

United States Patent
Wang

(10) Patent No.: US 6,658,205 B1
(45) Date of Patent: Dec. 2, 2003

(54) APPARATUS FOR ADJUSTING TEMPERATURE VARIATION VALUE CORRECTION OF AQUARIUM HEATING TUBE

(75) Inventor: Chiao-Ming Wang, Taichung Hsien (TW)

(73) Assignee: Meiko Pet Corporation, Taichung Hsien (TW)

( * ) Notice: Subject to any disclaimer, the term of this patent is extended or adjusted under 35 U.S.C. 154(b) by 0 days.

(21) Appl. No.: 10/293,290

(22) Filed: Nov. 14, 2002

(51) Int. Cl.⁷ ................................................. H05B 1/02
(52) U.S. Cl. ........................ 392/498; 392/503; 392/497
(58) Field of Search ................................ 392/503, 498; 219/523; 372/497, 807

(56) References Cited

U.S. PATENT DOCUMENTS

| 3,560,707 A | * | 2/1971 | Kolfertz ..................... 392/503 |
| 4,072,847 A | * | 2/1978 | Craven ....................... 219/523 |
| 4,152,263 A | * | 5/1979 | Goldman et al. ............ 210/169 |
| 4,156,128 A | * | 5/1979 | Craven ....................... 219/523 |
| 4,315,143 A | * | 2/1982 | Willinger et al. ........... 219/523 |
| 4,327,281 A | * | 4/1982 | Jager et al. ................. 219/523 |
| 5,568,587 A | * | 10/1996 | Marioni ...................... 392/498 |

* cited by examiner

Primary Examiner—Thor Campbell
(74) Attorney, Agent, or Firm—Rosenberg, Klein & Lee

(57) ABSTRACT

An apparatus for adjusting temperature variation value correction of an aquarium heating tube and particularly an apparatus that is capable of adjusting temperature variation correction of an aquarium heating tube according to use conditions of the aquarium includes an adjusting dock with a duct extending upwards to house a screw rod. The screw rod has an upper end to fasten to a squared rotary rod which is extended outside an upper lid to couple with a spline round hole formed on a rotary knob. The screw rod has a lower end mating a biased member to accurately adjust the interval of a first electric contact of a movable strip and a second electric contact of an electrode thereby to control electric connection or break. By pulling the rotary knob away from the rotary rod and turning to a correcting temperature variation value, the heated temperature may be coincided with the actual water temperature.

5 Claims, 10 Drawing Sheets

APPARATUS FOR ADJUSTING TEMPERATURE VARIATION VALUE CORRECTION OF AQUARIUM HEATING TUBE

BACKGROUND OF THE INVENTION

1. Field of the Invention

The invention relates to an apparatus for adjusting temperature variation value correction of an aquarium heating tube and particularly an apparatus for adjusting temperature variation value correction of an aquarium heating tube according to use condition of the aquarium.

2. Description of the Prior Art

A conventional aquarium 10 as shown in FIG. 1 usually includes a thermometer 11 to measure and display water temperature and a heating tube 20 which has capability to adjust the setting value of heating temperature and can automatically perform heating when the temperature is below the setting temperature value.

Refer to FIG. 2 for the conventional heating tube 20. It mainly includes a head 21 located on the top end of the heating tube with a turning knob 22 located on the head 21 to directly turn a lifting screw rod 23. The screw rod presses an adjusting strip 24 to change the distance between the adjusting strip 24 and another fixed strip 25. The adjusting strip 24 and the fixed strip 25 bond respectively to a magnet 26 and a metal member 27. One of the strips is connected to a heating coil 28. When heated, the fixed strip 25 deforms because of the heat. Thus the magnet 26 and the metal member 27 bonded to the two strips gradually move towards each other and are attracted to form an electric contact for heating or breaking off to stop heating, therefore control functions are established.

Based on previous discussion, it is clear that by rotating the turning knob 22, the interval between the two strips may be changed. Hence such a phenomenon may be used to indicate the heating temperature. It is not based on the actual water temperature in the aquarium. In designing the general heating tubes, the design of the adjustment of the interval is based on the volume and normal water temperature of the standard aquariums.

However from users' standpoint, the real problem is that the heating tube does not necessary match the aquarium. For instance, the specification of the heating tube may be for 50 liters, while user's aquarium may have the capacity of 55 liters. In addition, variation of water temperature often is affected by the ambient temperature, such as snowy winter and sweltering summer have great impact on water temperature in the aquarium. In such a circumstance, it could happen that while the heating temperature is set at 85° F. for the heating tube, but the actual temperature being heated in the aquarium 10 may be merely 81° F. In other words, though the heating tube 20 is set to stop heating when the temperature reaches 85° F., because of the factors such as the volume of the aquarium and ambient temperature, the water temperature in the aquarium never reaches 85° F. (with the actual temperature reaches only 81° F., there is a variation of 4° F. between the setting water temperature to be heated and the actual water temperature). Hence users have to bear in mind this temperature variation of 4° F., and to adjust the heating temperature of the heating tube to 89° F. so that the actual temperature may reach 85° F. in the heating process. However, users do not always remember the temperature variation value like this. In the event that users forget such a variation value and mistakenly adjust the variation setting, fish in the aquarium could perish. Moreover the conventional heating tubes use the turning knob 22 to directly lift or lower the screw rod 23 to push the strip. Adjusting displacement is rough and not accurate. It also could cause troubles. In view of the aforesaid disadvantages, to develop an improved adjusting apparatus to overcome the temperature variation occurred to the heating tube of the aquarium and the actual water temperature is the focus of this invention.

SUMMARY OF THE INVENTION

The primary object of the invention is to provide an apparatus for adjusting temperature variation value correction of an aquarium heating tube that is easy to operate and can rapidly correct the temperature variation to enable the heating temperature to coincide with the actual water temperature.

Another object of the invention is to provide an apparatus for adjusting temperature variation value correction of an aquarium heating tube that can fine tune the temperature setting to achieve more accurate temperature adjustment.

In order to achieve the foregoing object, the invention mainly includes an adjusting dock which has a lower end connecting to a heating coil and is coupled with a duct set which is extended upwards to house a screw rod. The screw rod has an upper end fastening to a squared turning rod which is extended outside an outer lid for coupling with a round spline opening of a turning knob. Turning the turning knob, the screw rod will be driven to push a movable strip to adjust the distance between the movable strip and the electric contact of an electrode. The movable strip is connected to the heating coil. When heated, the strip deforms due to the heat so that the electric contact of the movable strip may contact with or separate from the electric contact of the electrode thereby to control heating or stop heating. The screw rod has a lower section located in a hollow section of the adjusting dock to engage with a longitudinal screw hole of a transverse sleeve. The transverse sleeve is moved up or down by the screw rod to push a biased member which moves in a diagonal manner along two opposing transverse slots on the side walls to generate a miniature displacement. Therefore the movable strip may be pushed and moved more accurately. The turning knob may be pulled away from the turning rod to turn and correct the temperature variation value in a simple operation thereby to enable the heating temperature to coincide with the actual water temperature.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
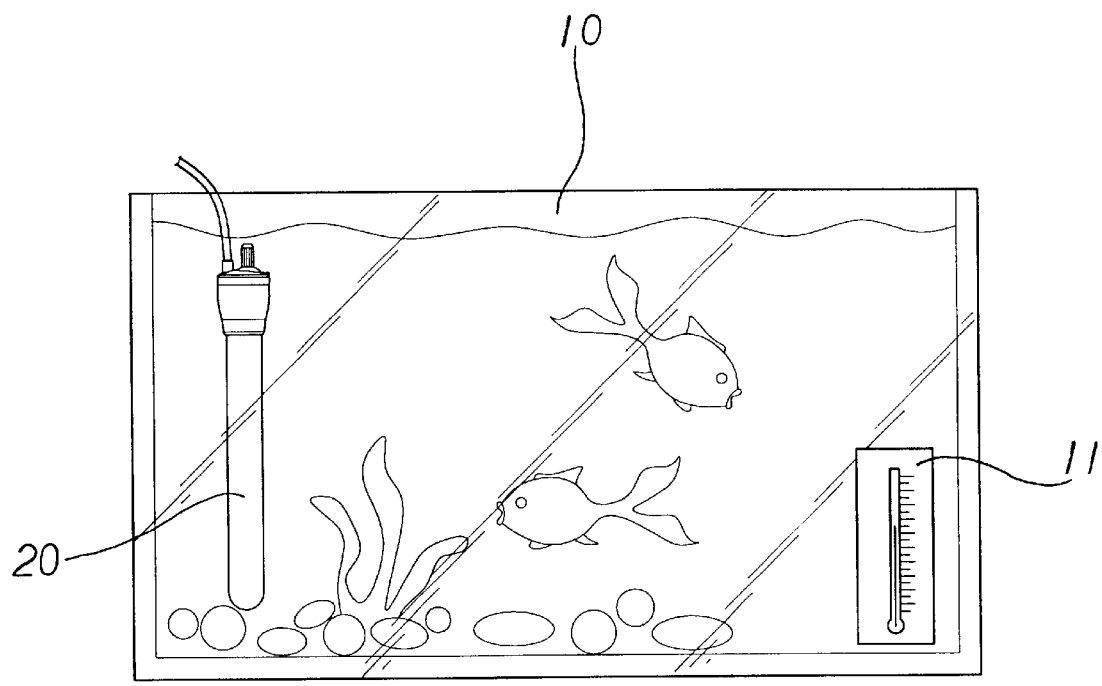
FIG. 1 is a schematic view of a conventional aquarium equipped with a thermometer and a heating tube.
Figure 2:
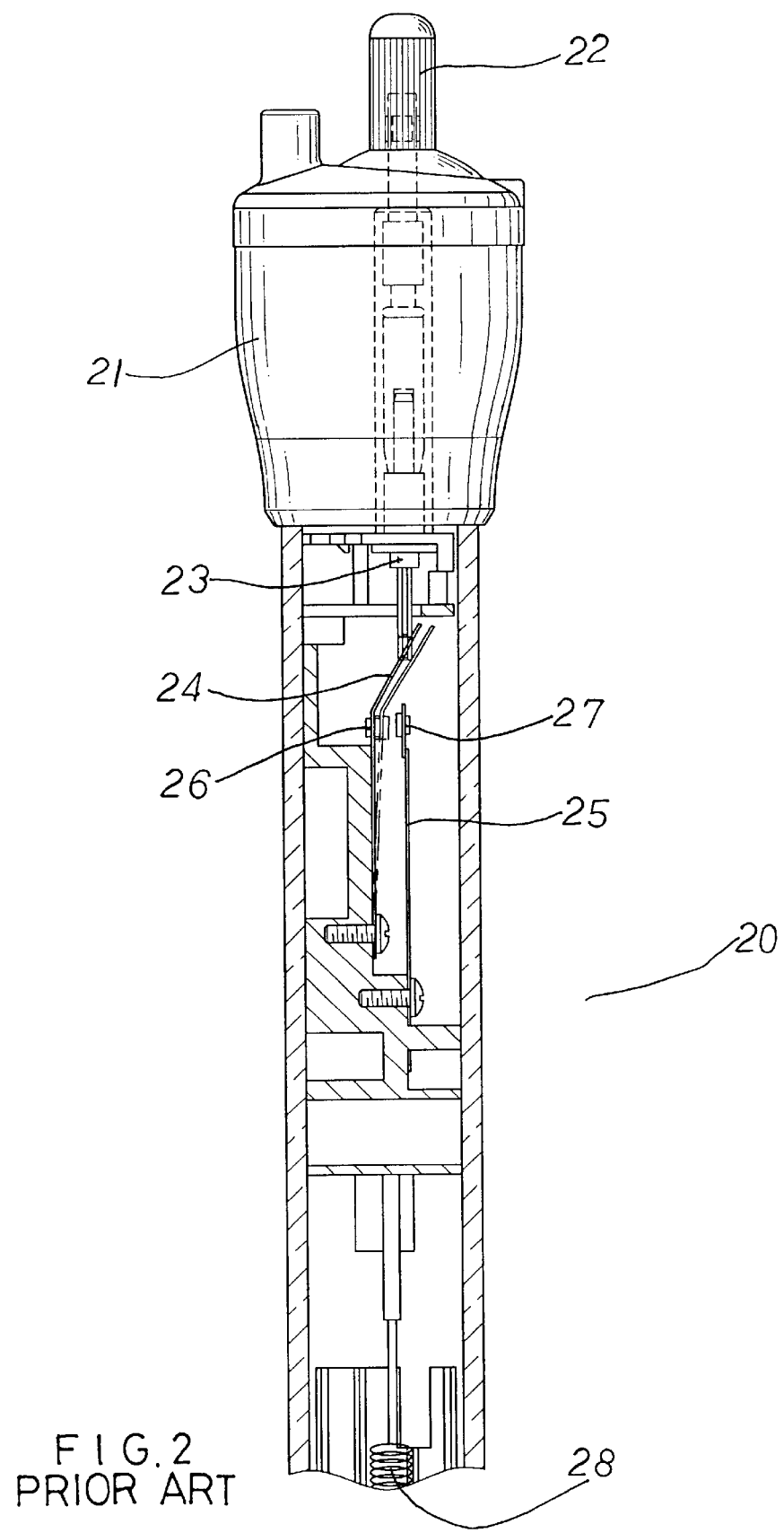
FIG. 2 is a sectional view of a conventional heating tube.
Figure 3:
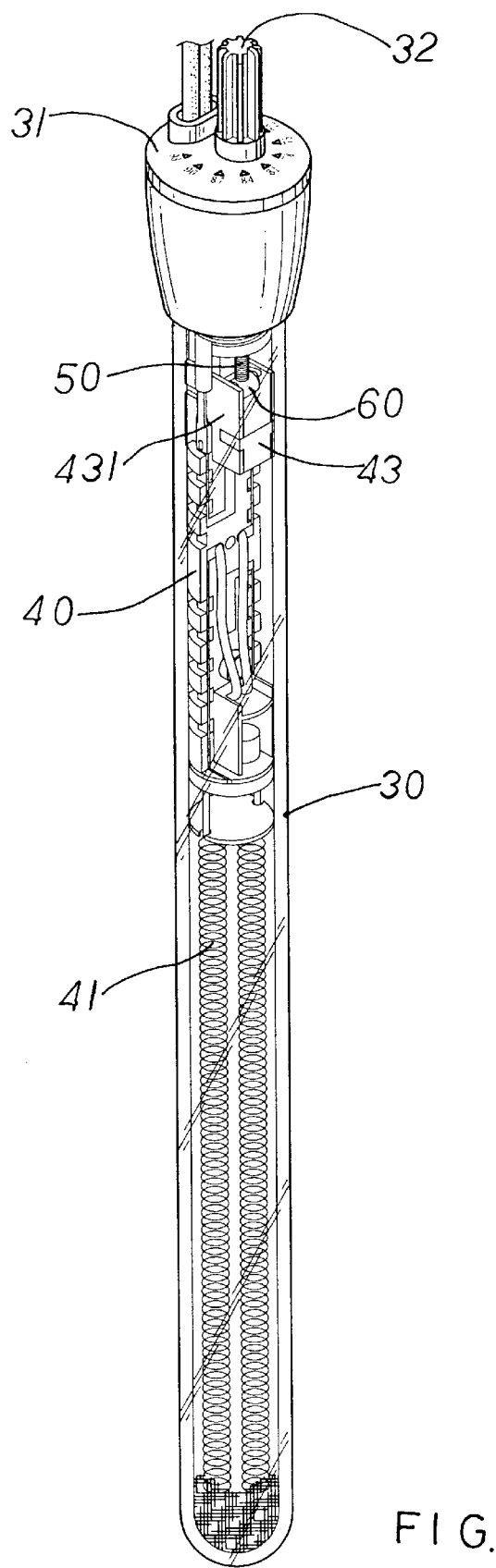
FIG. 3 is a perspective view of the invention.
Figure 4:
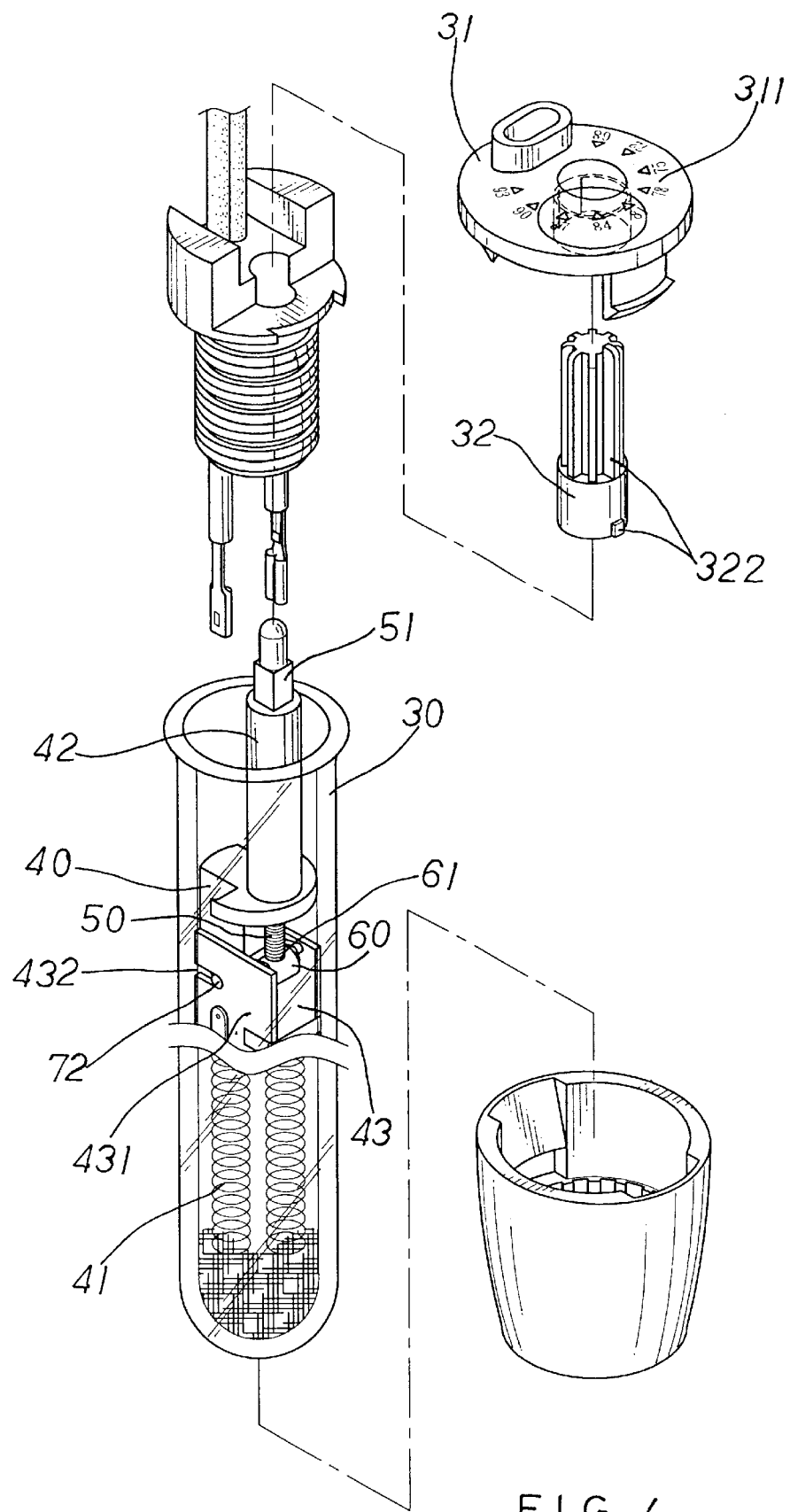
FIG. 4 is an exploded view of the invention.

Referring to FIGS. 3 and 4, the invention mainly includes a glass tube 30 which houses an adjusting dock 40 that has a lower end connecting to a heating coil 41. There is a duct 42 extending upwards from the adjusting dock 40 that houses a screw rod 50. The screw rod 50 has an upper end fastened to a rotary rod 51 which is extended outside an upper lid 31 to couple with a turning knob 32. The adjusting dock 40 has a lower section to form a hollow section 43 which has two side walls 431. The screw rod 50 also is extended between the two side walls 431 of the adjusting dock 40 to engage with a longitudinal screw hole 61 of a transverse sleeve 60.

Figure 5:
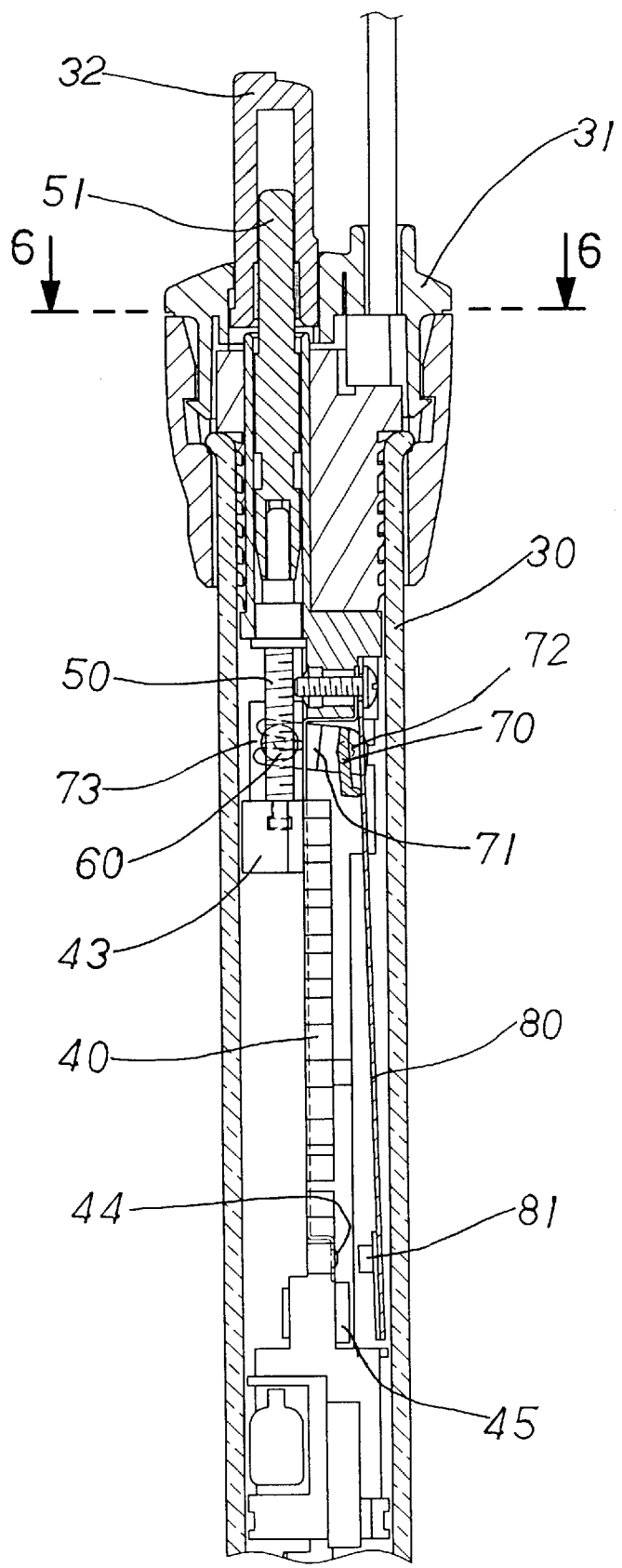
FIG. 5 is a sectional view of the invention.

Referring to FIGS. 4 and 5, there is a biased member 70 formed in ⊓-shape from the top view having two sides forming respectively a corresponding push plate 71. The push plate 71 has a stub shaft located on an outer side of one end thereof to wedge in a transverse slot 432 formed on the two side walls 431 of the hollow section 43 of the adjusting dock 40. The two push plates 71 have another end forming respectively a wedge slot 73 which is directed upward diagonally to couple with two stub shafts 62 located on two ends of the transverse sleeve 60 (referring to FIG. 8). The biased member 70 may be pushed and moved diagonally in the wedge slot 73 by the transverse sleeve 60 through the stub shafts 62 so that the biased member 70 turns angularly about the stub shafts 72 to move upwards or downwards for a small displacement to push a longitudinal movable strip 80 bonded to the outer side of the biased member 70 to move a displacement thereby to alter the distance between an electric contact 81 located on the lower end of the movable strip 80 and an electric contact 44 of an electrode located on the lower section of the adjusting dock 40. The adjusting dock 40 further has a magnet 45 corresponding to the lower end of the movable strip 80.

Figure 6:
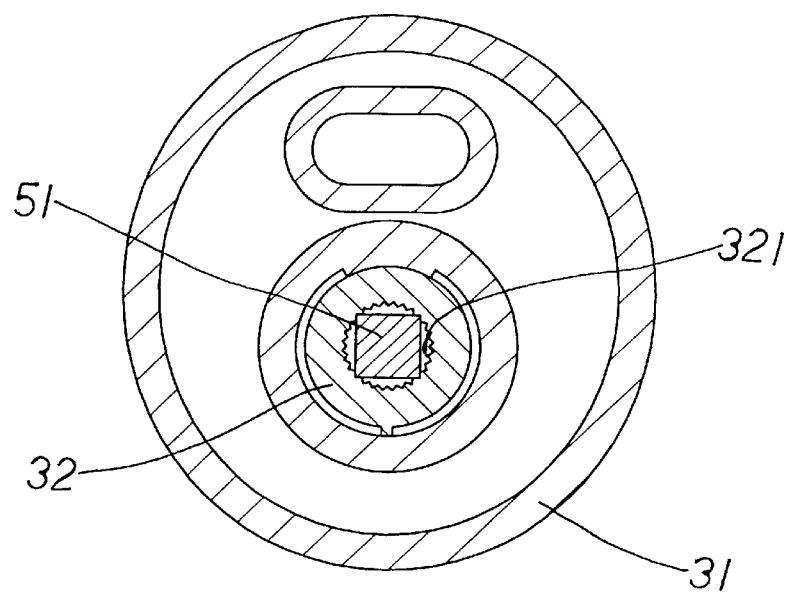
FIG. 6 is a cross section taken on an upper portion of FIG. 5.

Referring to FIGS. 5 and 6, the rotary rod 51 has a squared cross section to mate a cavity formed in the turning knob 32 which has a round spline hole 321 with longitudinal teeth formed on the inner peripheral surface to allow the four right angle corners of the rotary rod 51 to wedge in at any angle in the rotary knob 32. For adjusting the temperature variation value, pull the rotary knob 32 upwards to move away from the rotary rod 51; next, turn the rotary knob to the desired temperature scale 311 where correction to be made; then push the rotary knob downwards to engage again to coincide the temperature scale with the actual temperature (as shown in FIG. 7).

Figure 7:
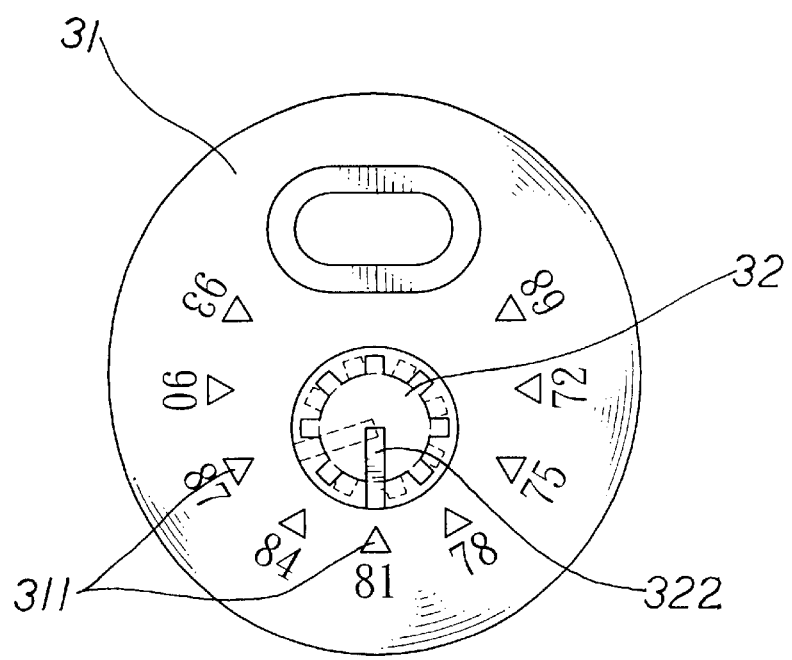
FIG. 7 is a top view of the upper lid of the invention.
Figure 8:
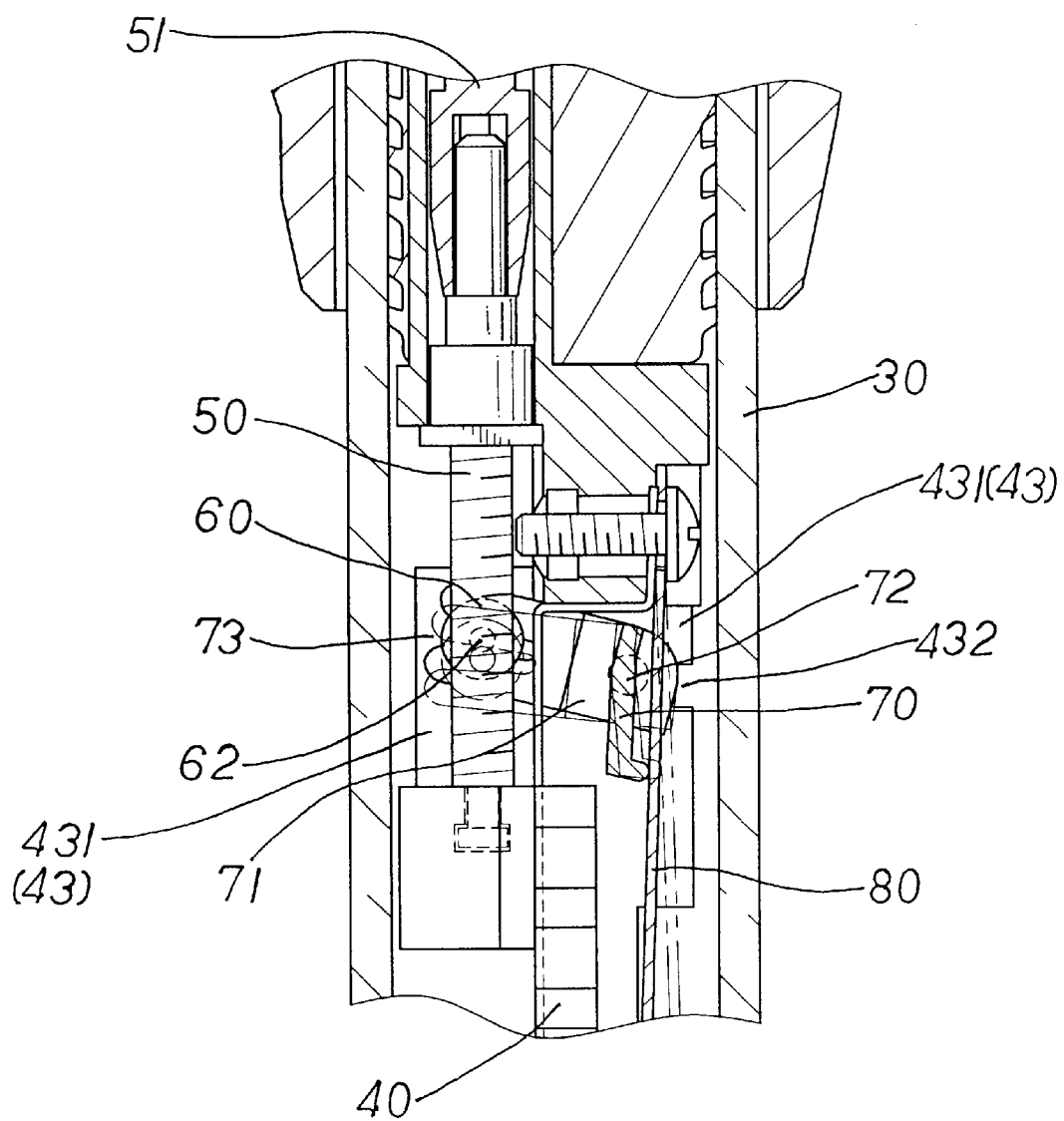
FIG. 8 is a schematic view of the invention in the operation of setting heating temperature.

Refer to FIGS. 7 and 8 for operations of setting the temperature. The rotary knob 32 above the upper lid 31 has a temperature indication 322. The upper lid 31 around the perimeter of the rotary knob 32 is carved with the temperature scale 311. As shown in FIGS. 5 and 8, when there is a desire to lower the setting temperature, turn the screw rod 50 through the rotary knob 32 and the rotary rod 51, the screw rod drives the coupled transverse sleeve 60 in the lower section downwards, and the stub shafts 62 on two ends push the biased member 70 diagonally. The biased member 70 turns about the stub shafts 72 of the two push plates 71 for a small angular displacement (also referring to FIG. 5) to push the movable strip 80 outwards to increase the distance between the electric contact 81 on the lower end thereof and the electric contact 44 of the electrode at the lower section of the adjusting dock 40. By contrast, when there is a desire to increase the setting temperature, turn the rotary knob 32 in the reverse direction to move the transverse sleeve 60 upwards, the outward pushing force of the biased member 70 is released and pushing on the movable strip 80 is stopped, the movable strip 80 is retracted automatically to narrow the distance between the electric contact 81 on the lower end thereof and the electric contact 44 of the electrode. Thus through the miniature adjustment displacement of the screw rod 50 and the movable strip 80 which expands when heated and retracted when cooled, and the attraction of the magnet 45, electric heating time may be controlled, and accurate heating temperature may be set and accomplished.

Figure 9:
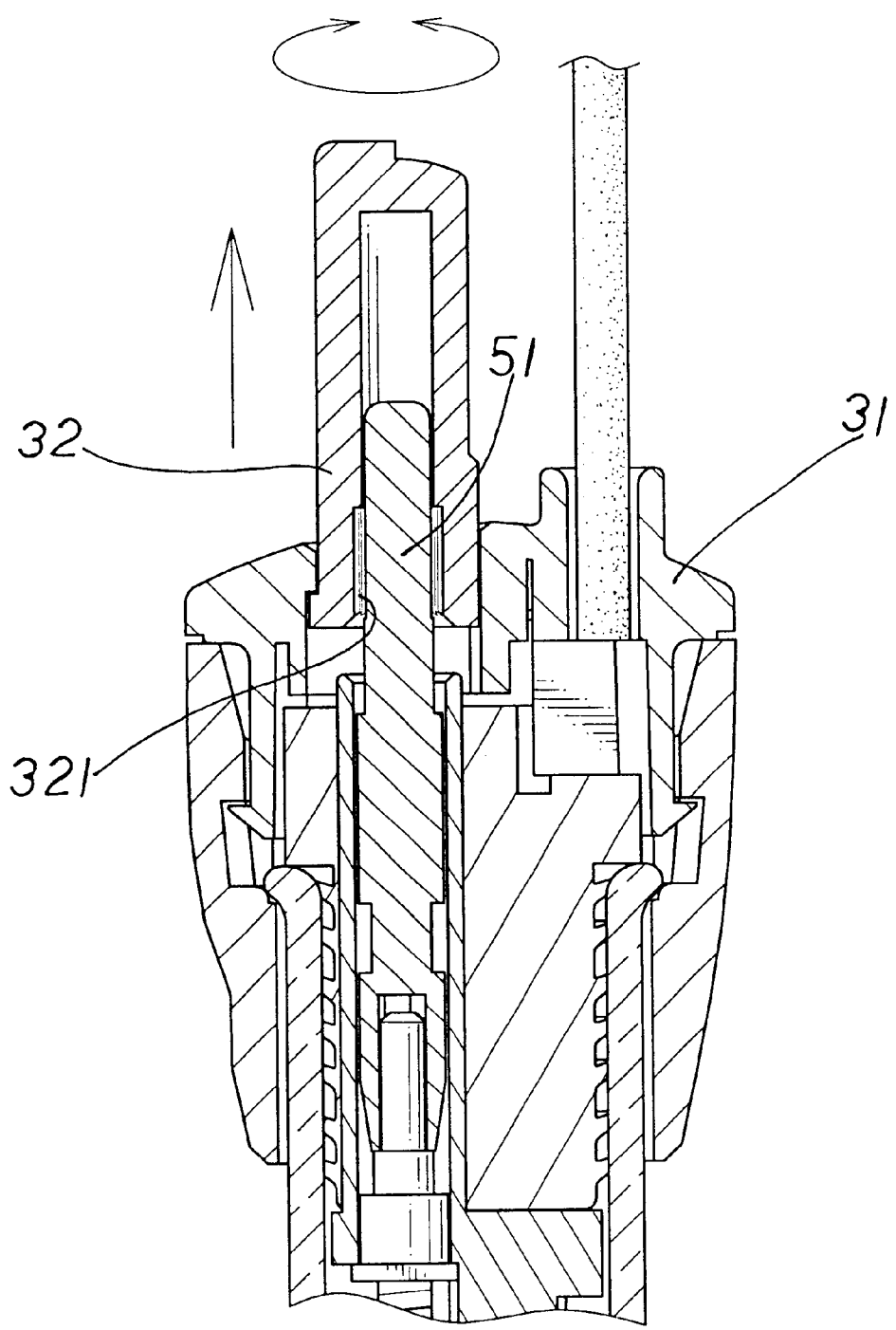
FIG. 9 is a schematic view of the invention in the operation of correcting temperature variation value.

Refer to FIG. 9 for operation of correcting the temperature variation value. Presumed that the measured water temperature is 81° F., and the heating temperature set by the temperature indication 322 of the rotary knob 32 is pointed to 87° F. on the temperature scale 311 (shown by broken line in FIG. 7), the temperature variation value is 6° F. Operation for correction is indicated by the arrow shown in FIG. 9. First, pull the rotary knob 32 upwards to separate from the square rotary rod 51; next, turn the indication to 81° F. shown by the solid line; then push the rotary knob 32 downwards to couple the round spline hole 321 with the square rotary rod 52 again. Thus the operation of correcting the temperature variation value is accomplished easily.

As previously discussed, by turning the rotary knob 32 to rotate the screw rod 50, the transverse sleeve 60 may be moved up or down to push the biased member 70 which turns in a small way to move the movable strip 80, thus the screwing up or down of the screw rod 50 makes the biased member 70 moving at a small displacement thereby can move the movable strip 80 with a precise displacement to accurately adjust and correct the temperature.

Figure 10:
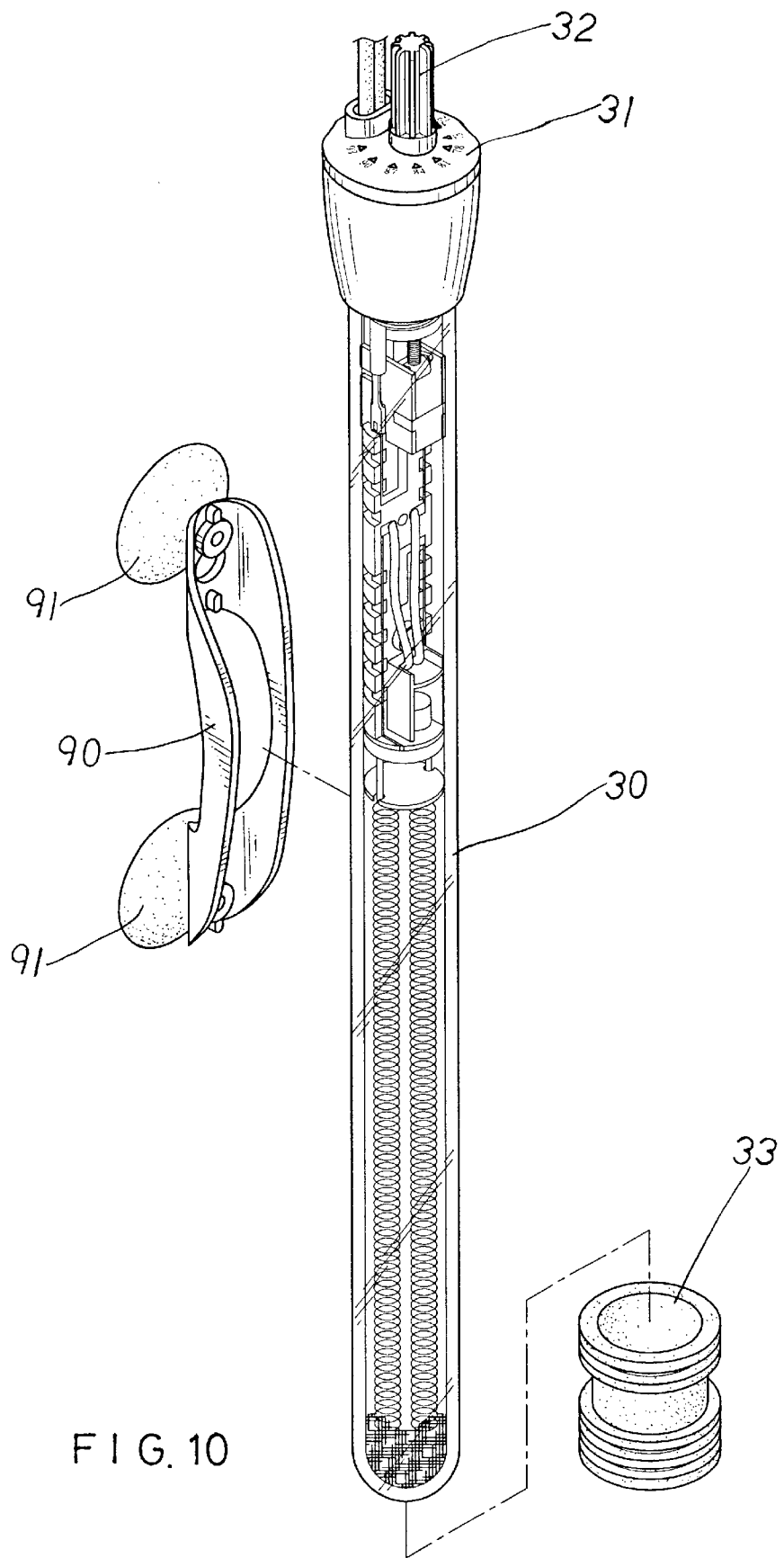
FIG. 10 is an exploded view of the heating tube of the invention for coupling with an anchor member and a guarding member.
Figure 11:
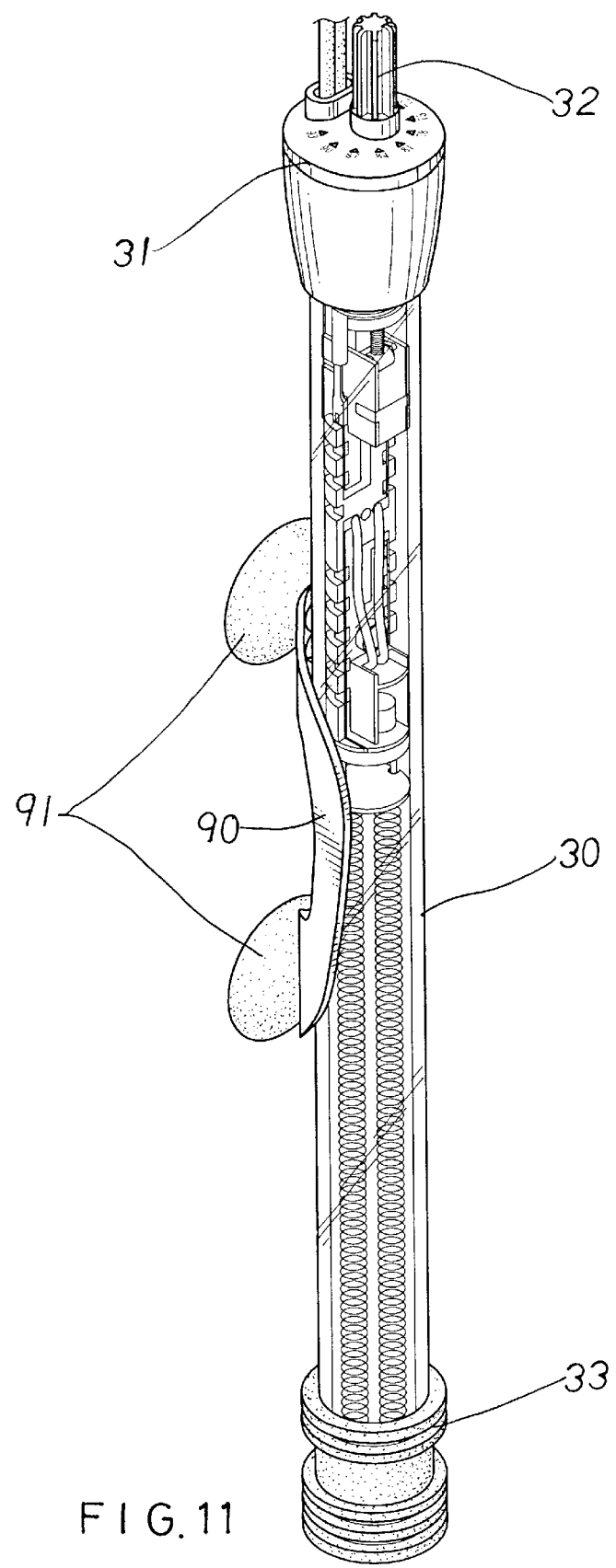
FIG. 11 is a perspective view of the heating tube of the invention coupled with an anchor member and a guarding member.

Referring to FIG. 10, the heating tube of the invention also may be coupled with an anchor member and a guarding member. The lower end of the glass tube 30 may be coupled with a rubber sleeve 33 to protect the glass tube 30 from being shattered by impact. In addition, a clip 90 with suction cups 91 may be mounted onto the inner wall of the aquarium to hold the heating tube at the middle portion as shown in FIG. 11.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

I claim:

1. An apparatus for adjusting temperature variation value correction of an aquarium heating tube comprising a glass tube housing an adjusting dock which has a lower end connecting to a heating coil and an upper side coupling with a duct which is extended upwards, the duct housing a screw rod which has an upper end fastened to a rotary rod, the rotary rod running through an upper lid to couple with a rotary knob, the rotary knob being turnable to drive the screw rod to move a movable strip thereby to adjust the distance between a first electric contact located on the movable strip and a second electric contact located on an electrode, the movable strip being connected to the heating coil and being deformed when heated to allow the first electric contact of the movable strip to contact or separate from the second electric contact of the electrode;

wherein the rotary rod is formed with a squared cross section coaxially engaged in releasable manner by a round spline hole formed in the rotary knob, the round spline hole having a square accommodating cavity located therein and an inner perimeter portion formed with longitudinal teeth, the squared rotary rod to engaging the inner perimeter portion to be adjustably wedged therein in a preselected angle relative to the rotary knob, whereby the rotary knob is removable from the rotary rod and turnable to a temperature scale to be corrected for insertion again.

2. An apparatus for adjusting temperature variation value correction of an aquarium heating tube comprising a glass tube housing an adjusting dock which has a lower end connecting to a heating coil and an upper side coupling with a duct which is extended upwards, the duct housing a screw rod which has an upper end fastened to a rotary rod, the rotary rod running through an upper lid to couple with a rotary knob, the rotary knob being turnable to drive the screw rod to move a movable strip thereby to adjust the distance between a first electric contact located on the movable strip and a second electric contact located on an electrode, the movable strip being connected to the heating coil and being deformed when heated to allow the first electric contact of the movable strip to contact or separate from the second electric contact of the electrode;

wherein the rotary rod is formed with a squared cross section to mate a round spline hole formed in the rotary knob, the round spline hole having a squared cavity located therein and an inner perimeter formed with longitudinal teeth to allow the squared rotary rod to wedge selectively in a plurality of angles relative to the rotary knob such that the rotary knob is removable from the rotary rod and turnable to a temperature scale to be corrected for insertion again; and, wherein the adjusting dock housing a lower section of the screw rod has a hollow section with two side walls, the screw rod being located between the two side walls and engaged with a longitudinal hole of a transverse sleeve, the transverse sleeve being movable upwards or downwards by the screw rod to push a biased member located between the two side walls of the adjusting dock.

3. The apparatus of claim 2, wherein the biased member is formed with substantially an inverted U shape having two push plates on two sides thereof and a first stub shaft located on an outer surface of one end of each push plate, the first stub shaft being wedged in a transverse slot formed on the two side walls in the hollow section of the adjusting dock, the two push plates having another end which has a wedge slot directed upwards to couple with a second stub shaft located on two ends of the transverse sleeve.

4. The apparatus of claim 1 further having a clip for clipping the glass tube, the clip having a suction cup.

5. The apparatus of claim 1 further having a rubber guarding sleeve to couple with a lower end of the glass tube.

* * * * *